Dec. 5, 1967  S. A. DIACHENKO  3,356,166
PERCUSSIVE TOOL
Filed April 15, 1965

INVENTOR.
SERGEJ A. DIACHENKO
BY Joseph W. Holloway
ATTORNEY

United States Patent Office 3,356,166
Patented Dec. 5, 1967

3,356,166
PERCUSSIVE TOOL
Sergej A. Diachenko, Denver, Colo., assignor to Gardner-Denver Company, a corporation of Delaware
Filed Apr. 15, 1965, Ser. No. 448,455
5 Claims. (Cl. 173—139)

ABSTRACT OF THE DISCLOSURE

A retainer for the chuck of a percussive tool, such as a rock drill or paving breaker, that is readily releasable, being essentially a formed spring wire piece with radially projecting ears permitting manipulation of the retainer with a suitable tool. The retainer fits into a groove in the body or casing of the tool and engages a sloped annular surface on the chuck to retain the chuck in the bore of the tool casing. A pressurized chamber at one end of the chuck holds the chuck, retainer, and casing securely in relation to each other while the tool is in use.

---

This invention generally concerns percussive tools of the pressure fluid actuated type intended for the performance of drilling, hammering and allied operations. While not limited thereto, the invention may be employed to good advantage with tools such as rock drills and paving breakers.

Tools of the aforesaid type commonly comprise a hollow cylinder, a front head and a back head which are retained in end-to-end abutment by so-called side rods. One function of the front head is to receive and retain a chuck which positions a working implement in blow-receiving relation with a hammer which reciprocates in the cylinder. One aspect of this invention is the provision of a tool having an elongated tubular casing which replaces the separate cylinder and front head construction of conventional tools. Elimination of a front head, or an equivalent structural member, creates the need for means for retaining the chuck and other operating tool parts in properly assembled relation within the tubular casing; accordingly, provision of such a chuck retaining means is an important object of this invention.

Another function of the traditional front head of percussive tools is to mount a releasable latching device which coacts with the implement held by the chuck to prevent the implement from falling out of the chuck when the tool is lifted from its work. In accordance with the present invention, wherein a front head is eliminated, an implement latch is advantageously mounted on the chuck itself and becomes a part of the chuck structure.

Another object of this invention is the provision of a chuck and a tubular casing therefor which coact with a chuck retaining device disposed within the casing.

Another object is to provide a chuck retaining device which positively restrains the chuck in the casing against unintended disassembly yet is readily releasable to permit disassembly of the chuck and associated parts for inspection and maintenance.

Still another object is to provide a tool of the type under consideration wherein pressure fluid acting on pressure surfaces of the chuck parts is employed for augmenting the holding effect of the chuck retaining means.

These and other objects and advantages will appear upon reading the following specification and claims and upon considering in connection therewith the attached drawings in which:

Figure 2:
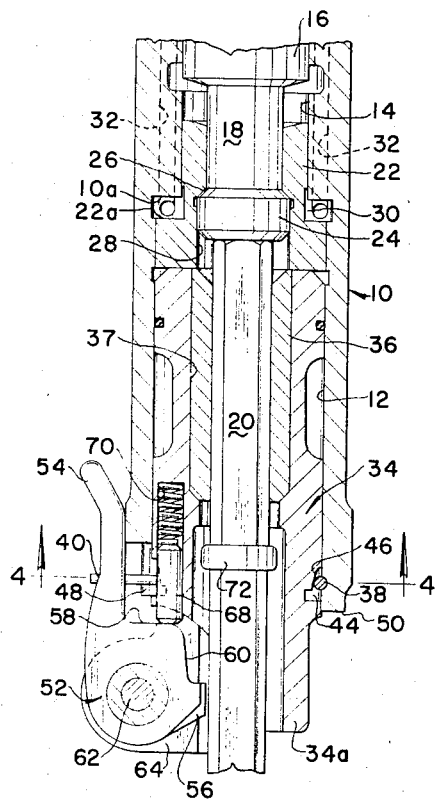
FIG. 2 is a section taken substantially along lines 2—2 of FIG. 3.
Figure 1:
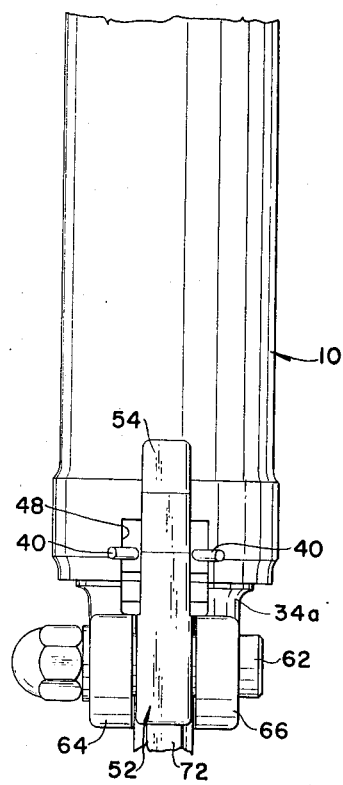
FIG. 1 is a fragmentary plan view of a percussive tool.
Figure 3:
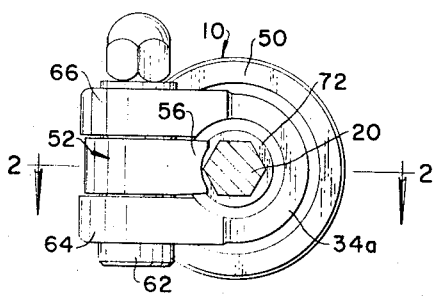
FIG. 3 is a front elevation of the tool shown in FIGS. 1 and 2.

In the drawings, an elongated tubular tool housing or casing is generally designated by numeral 10. The casing is provided with a bore 12 opening to the front end thereof and with a connecting bore 14 of reduced diameter which extends rearwardly and comprises a fluid expansion chamber for the percussive motor of the exemplary tool. A hammer piston 16 reciprocates within bore 14 as motive fluid, usually compressed air, is intermittently introduced above and below the piston in a well understood manner. A tappet 18 is disposed in blow transmitting relation between the hammer 14 and the rear face of a working implement 20. A bushing 22 surrounds the tappet 18 and is axially movable within the bores 12 and 14 for a purpose to be described. With the parts in the relative position shown in FIG. 2, an enlarged head portion 24 of the tappet 18 is seated against a sloped shoulder 26 defined by the bushing bore 28; and, the forward face of the head 24 is engaged with the rear end of the implement 20 which extends into the bushing bore 28. When the tool is energized, the hammer 16 will deliver a series of blows to the tappet 18 causing the latter to impact the implement 20 and to drive the same percussively against a work surface. Usually the tappet 18 will rebound sharply from the implement 20 and will move rearwardly to impact the bushing 22 thereby creating vibrations and noise. In the present tool such vibration of the bushing 22 is damped or absorbed by an air cushion in an annular chamber 30 defined between spaced facing pressure surfaces 22a and 10a on the bushing 22 and the casing 10, respectively. Pressure fluid is supplied to chamber 30 through passages 32 from the motive fluid supply for the tool. Preferably, pressure is maintained in chamber 30 whenever the tool is connected to a pressure fluid source so that the bushing 22 and a chuck 34 are urged axially forwardly in the manner of a piston even though the percussive motor may not be operating.

Figure 4:
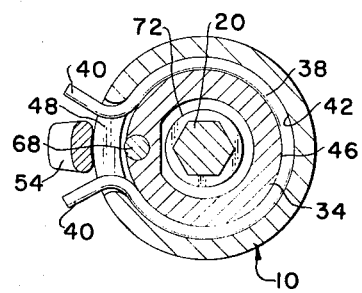
FIG. 4 is a transverse section taken substantially along lines 4—4 of FIG. 2.

A chuck, generally indicated by numeral 34, is insertable into the forward end of the casing bore 12 into abutting relation with the tappet bushing 22. A wear sleeve 36 is pressed into a central bore 37 of the chuck 34 and slidably receives the rear or shank portion of the implement 20. The principal function of the chuck 34 is to slidably chuck the shank portion of the implement 20 in axial alignment with the hammer 16 and the tappet 18. As will be observed from the drawings, the illustrative tool does not include a front head or cap which is usually attached to the casing 10 for retaining the chuck within the casing bore. In accordance with the present invention, the chuck 34 is located and releasably held within the casing bore 12 by a radially compressible retaining spring 38. As best seen in FIG. 4, the spring 38 is generally U-shaped and is somewhat reentrant at its opening and terminates in outwardly bent ears 40. Preferably the spring is circular in cross section and is made of steel or some other strong, resilient material. The spring 38 is adapted to seat yieldably in a groove 42 in the internal wall of the casing 10 which opens inwardly to the bore 12 near the forward end thereof. In this seated condition, the spring is radially compressed and exerts a counterforce tending to bias itself in interfitting engagement with the groove 42. The chuck 34 is provided with an annular groove 44 in its outer surface which has an annular wall 46 sloping rearwardly from the groove. The depth of the groove 44 is greater than the diameter of the spring 38; therefore, the spring may be compressed to seat in groove 44 without projecting radially beyond the outer surface of the chuck 34. The ears 40 of spring 38 project radially outwardly through a forwardly and radially opening slot 48 in the front end of casing 10; whereby, the ears are readily accessible and may be pressed together manually or by a suitable tool to compress the spring radially into the annular groove 44.

In the assembly of the exemplary tool, the tappet 18 and its bushing 22 are first inserted into the front of the casing 10. Then the spring 38 is placed in groove 44 of the chuck and the chuck is inserted into the casing bore 12 until the spring 44 abuts the extreme forward surface 50 of the casing 10. The spring is then compressed by pressing the ears 40 together so that the spring does not project radially beyond the surface of the chuck. With the ears pressed together and aligned with the slot 48 the chuck is inserted into the casing bore 12 until the spring 38 passes the front surface 50 of the casing 10. The spring may then be released to bear against the wall of the bore 12; and, the spring will snap into groove 42 when it is moved axially into registration therewith. In this assembled condition, forward movement of the chuck 34 is limited by the interfering engagement of the spring 38 with the sloping wall 46 and the groove 42. Normally the self-bias of spring 38 will hold the same securely seated in the groove 42; however, the coaction of the sloped wall 46 and the spring 36 tends to seat the latter even more securely should the chuck tend to move forwardly out of the casing 10.

When the exemplary tool is connected to a compressed air line, not shown, air under pressure will be communicated to chamber 30 thereby exerting an axial force upon the pressure surface 22a of the bushing 22 and upon the chuck 34 which abuts with the bushing. Forward axial movement of the bushing 22 and chuck 34 under the urging of the compressed air in chamber 30 is limited by the interfering engagement of spring 38 with the sloping wall 46 and the groove 42 in the casing bore 12. It will be apparent that besides providing a cushion for tappet rebound, as hereinbefore described, the compressed air in chamber 30 biases the chuck axially forwardly to enhance the wedging action of the sloped wall 46 against the retaining spring 38 thereby further insuring against unintended disengagement of the spring from its mating groove 42.

To disassemble the parts from the casing bore 12, the groove 44 is brought into registration with the spring 36 by moving the chuck slightly to the rear. The ears 40 are then pressed together to compress the spring into the groove 44 thereby relieving the interference between the spring 36 and the wall of bore 12. The chuck is then freely withdrawable from the bore 12 to complete the disassembly.

From the foregoing description it will be appreciated that the spring 38, chuck 34 and casing 10 coact to provide a chuck retaining means characterized by simplicity, ease of assembly and disassembly, and great reliability and safety in operation. Moreover, the chuck 34 itself serves in a novel capacity as a pressure fluid actuated piston effective to hold the retaining spring 38 in properly assembled relation with the casing 10.

Another feature of the novel chuck construction is the provision of an implement latch or puller, designated generally by numeral 52, which is mounted directly on the chuck rather than on the casing 10 or a front head member. Generally the implement latch comprises a bell crank having a handle 54, a latching finger 56 and cam surfaces 58 and 60. The bell crank 52 is pivotable about a shaft 62 which penetrates aligned apertures in the spaced arms 64 and 66 of a U-shaped enlargement on the nose or forward end 34a of the chuck 34. A spring biased plunger 68 projects forwardly from a cavity 70 in the chuck 34 into yielding engagement with the bell crank surface 58 to hold the same against pivotal movement. In the latched or closed position of the latch 52, as viewed in the drawings, the finger 56 projects radially into the path of travel of a collar 72 formed on the implement 20. The limit of forward movement of the implement with respect to the chuck 34 is established by interfering engagement of the finger 56 and the collar 72. The handle 54 extends rearwardly between the projecting ears 40 of spring 38 and rests against the outer surface of the casing 10. To open the latch to permit withdrawal of the implement 20 from the chuck 34, the bell crank 52 is pivoted counterclockwise thereby angularly displacing the finger 56 out of the path of the collar 72. The plunger 68 will then yieldably bear against surface 60 to hold the latch in the open position.

It will be understood by those skilled in the art that the above description and accompanying drawings comprehend only general and preferred embodiments of the present invention and that various changes in construction, proportion and arrangement of parts may be made without departing from the spirit of the invention as set forth in the appended claims.

Having fully described the invention, I claim:

1. A chuck retaining means for a percussive tool, comprising:
   tubular casing means having a bore defining an internal wall;
   chuck means coaxially disposed in said bore and axially movable therein;
   releasable retaining means for said chuck means engaging said wall and said chuck means to retain the latter axially in said casing means;
   said wall and said chuck means provided with axially registerable grooves for receiving said retaining means;
   said retaining means comprising a radially compressible member which is self-biased to seat in said groove in said wall and to engage interferingly with said wall and said chuck means;
   said compressible member being radially compressible into the groove in said chuck means whereby the interfering engagement between said compressible member and said wall is relieved;
   said compressible member being provided with means projecting radially outwardly through said casing means which are compressible to relieve the interfering engagement between said compressible member and said wall.

2. Chuck retaining means for a percussive tool, comprising:
   casing means having a bore defining an internal wall;
   chuck means disposed in said bore and movable therein;
   retaining means for said chuck means engaging said wall and said chuck means to retain the latter in said casing means;
   said retaining means comprising a compressible member being compressible whereby engagement between said compressible member and said wall is relieved;
   said compressible member having radially projecting means engageable to effect compression of said compressible member thereby to relieve the engagement between said compressible member and said wall.

3. The invention according to claim 2, wherein:
   a nose portion of said chuck means projects axially from said casing;
   said chuck means is provided with a bore;
   a working implement is chucked in said chuck bore and is axially movable therein;
   said nose portion mounts releasable latch means for engaging said implement to prevent axial displacement of the same from said chuck bore; and
   handle means on said latch means engageable with said radially projecting means whereby rotation of said chuck means is prevented.

4. Chuck retaining means for a pressure fluid actuated percussive tool, comprising:
   tubular casing means having a bore defining an internal wall;
   chuck means coaxially disposed in said bore and axially movable therein;

releasable retaining means for said chuck means engaging said wall and said chuck means to retain the latter axially in said casing means;

said chuck means provided with surface means engageable with said retaining means for wedging the latter between said wall and said surface means when said chuck means is in response to movement in a direction tending to displace the said chuck means from the bore of said casing means;

axially movable means in said casing means;

pressure fluid conducting means defined by said casing means;

pressure fluid conducted by said pressure fluid conducting means operating on said axially movable means to press said surface means wedgingly against said retaining means.

5. The invention according to claim 4, wherein:
said surface means comprises a sloped annular wall relieved in said chuck means.

References Cited

UNITED STATES PATENTS

| 2,608,413 | 8/1952 | Peck | 279—19 |
| 3,060,894 | 10/1962 | Dean et al. | 173—139 |
| 3,063,508 | 11/1962 | Henry | 173—139 |
| 3,255,832 | 6/1966 | Leavell | 173—133 |

FRED C. MATTERN, JR., *Primary Examiner.*

L. P. KESSLER, *Assistant Examiner.*